Sept. 24, 1968  MASAHIDE NISHIDA ET AL  3,403,339
APPARATUS FOR DISPLAYING THE GAIN FACTOR AS A FUNCTION
OF A CHANGING INPUT SIGNAL APPLIED
TO AN ELEMENT UNDER TEST
Filed July 14, 1966
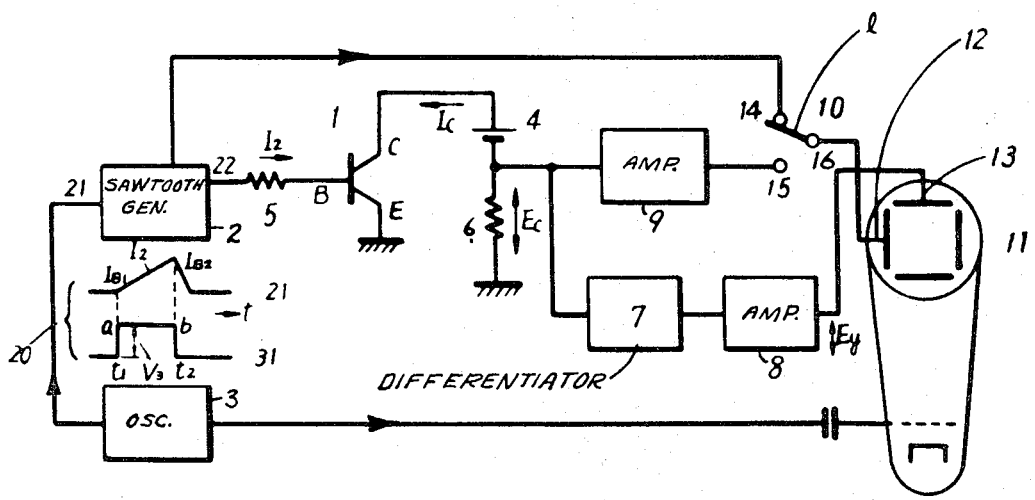
INVENTORS
MASAHIDE NISHIDA
SHIROH KITOH
TAKAYUKI SATOH
BY  G. C. Smith
ATTORNEY United States Patent Office 3,403,339
Patented Sept. 24, 1968

3,403,339
APPARATUS FOR DISPLAYING THE GAIN FACTOR AS A FUNCTION OF A CHANGING INPUT SIGNAL APPLIED TO AN ELEMENT UNDER TEST
Masahide Nishida, Shiroh Kitoh, and Takayuki Satoh, Tokyo, Japan, assignors to Yokogawa-Hewlett-Packard, Ltd., Tokyo, Japan, a corporation of Japan
Filed July 14, 1966, Ser. No. 565,287
Claims priority, application Japan, Sept. 17, 1965, 40/76,176
3 Claims. (Cl. 324—158)

ABSTRACT OF THE DISCLOSURE

A circuit for displaying the small signal characteristic curve of transistors on the display screen of a cathode-ray tube of an oscilloscope provides a direct display of the magntude of the small signal characteristics of a transistor under test as a function of current supplied to the transistor.

In certain devices for viewing small signal characteristices of transistors it has been customary to apply a constant driving voltage between emitter and collector electrodes of the transistor to be tested and to apply a current sweep signal to the base electrode with a small signal of constant amplitude superimposed over this sweep signal. This small signal component $\Delta i_c$ is detected from the collector current which is produced by the sweep signal $I_B$ applied to the base electrode and it is the relationship of said sweep signal $I_B$ vs. $\Delta i_c$ which is to be displayed on the screen of a cathode-ray tube. In this method, the amplitude of the small signal must be practically negligible compared with the variation range of the output signal. However, if the variation range of the collector current output becomes small because the current sweep signal becomes small, the magnitude of the small signal becomes appreciable in relative value. Also, the small signal frequency must be relatively high compared with the repetition frequency of sweep signal in order to facilitate separation of the small signal component from the collector output signal. Thus, in trying to directly observe the low frequency small signal characteristics of the transistor, the repetition frequency of the sweep signal becomes very low, thus producing discernable flicker in the image on the display screen. Another problem is that it is difficult to realize a circuit capable of displaying the small signal characteristic curve and the static characteristic curve simultaneously. These problems are overcome in the present invention illustrated in the accompanying drawing which shows a schematic diagram of the invention. Signal from source 2 varies linearly with time in a saw-tooth manner, as shown in 21. The saw-tooth wave from source 2 is controlled by the output from oscillator 3 which produces a square wave as shown in 31. The time relation between output wave 31 from oscillator 3 and output wave 21 from saw-tooth wave signal source 2 is shown in wave from diagram 20. Also, the output of oscillator 3 is applied to the grid electrode of cathode-ray tube 11 to control the brightness of the displayed beam.

Output current $I_2$ from saw-tooth wave signal source 2 is applied to base electrode B of the transistor 1 to be tested via resistor 5. The serial circuit of DC voltage source 4 and resistor element 6 is connected between the collector electrode C of transistor 1 and the emitter electrode E. Collector current $I_C$ of transistor 1 flows from source 4 through resistor element 6 and generates between its terminals a volatge $E_C$ which is proportional to $I_C$. This voltage $E_C$ is applied to the inputs of differentiation circuit 7 and voltage amplifier 9. Differentiation circuit 7 includes a capacitor and a resistor element connected to produce at its output the differentiated signal applied to the input. The output voltage of differentiation circuit 7 is amplified to an adequate magnitude by amplifier 8 and is applied to Y-axis deflecting plate 13 of the cathode-ray tube 11.

At the same time, the output from saw-tooth wave signal source 2 is applied to X-axis deflecting plate 12 of tube 11 via selector switch 10. Thus the small signal characteristic curve of transistor 1 to be tested may be displayed on tube 11.

In operation, the signal from source 2 which supplies the current $I_2$ begins to rise at time $t_1$ on the output wave $V_3$ from square wave oscillator 3, such that its magnitude varies linearly with time to time $t_2$, after which it drops to its initial value. At the same time, output voltage $V_3$ from source 3 is applied to the intensity grid of tube 11 and intensifies the displayed beam from time $t_1$ to time $t_2$. At the same time, base current $I_2$ from source 2 produces collector current $I_C$ of related value which flows in resistor 6, thereby producing a voltage $E_C$ which is proportional to $I_C$. Circuit 7 differentiates the voltage $E_C$ to produce the volatge $E_y$ whose magnitude is proportional to $(dE_C/dt)$ which is applied to Y-axis deflecting plate 13 of tube 11.

Thus, the small signal constant $h_{fe}$ for a collector current $I_C$ which corresponds to a base current $I_B$ at an arbitrary time $t$ during the interval between $t_1$ and $t_2$ can be expressed as follows:

$$h_{fe} = \frac{dI_C}{dI_B} = \frac{\frac{dI_C}{dt}}{\frac{dI_B}{dt}}$$

However, since $I_B$ varies at a fixed rate with time, then:

$$h_{fe} = \frac{1}{K}\frac{dI_C}{dt}$$

where K is a constant. At time $t$, voltage $E_y$ applied to Y-axis deflecting plate 13 is proportional to $dI_C/dt$, and therefore the deflection amplitude from the base line is also proportional to $dI_C/dt$ and is therefore the magnitude of $h_{fe}$ at that time. At the same time $t$, the X-axis voltage on deflecting plate 12 has a value which corresponds to the value of base current $I_B$. Thus, the curve displayed on the screen of the cathode-ray tube 11 during one sweep represents the small signal characteristic curve of transistor 1 to be tested where the X-axis is the scale of base current $I_B$ and Y-axis is the scale of $h_{fe}$. If selector switch 10 is set to the position which connects terminals 15 and 16, a curve representing the relation of $h_{fe}$ to collector current $I_C$ is displayed on the screen of tube 11.

Thus, this invention eliminates the superimposing of an alternating signal of extremely small amplitude upon the variable signal which is applied to the transistor to be tested, and therefore eliminates the need for a device for separating this alternating signal component from the output signal of the transistor.

We claim:
1. A circuit for measuring the gain factor as a function of an input signal applied to an element under test which has an input and an output, the circuit comprising:
  a source of signal having an amplitude which varies substantially linearly with time;
  an indicator having a pair of deflection circuits for displaying signals applied thereto along coordinate axes;
  means connected to said source for applying the signal herefrom to the input of an element under test and to a deflection circuit of said indicator; and means including a differentiating circuit connected to the other deflection circuit of said indicator for applying thereto a signal from the output of the element under test which is produced in response to the signal applied thereto from the source.

2. A circuit as in claim 1 for measuring the parameters of an element such as a transistor wherein:

said source repetitively produces a signal having an amplitude which increases substantially linearly with time between selected limits;

said indicator is a cathode-ray display tube having X-coordinate and Y-coordinate deflection circuits;

the signal from said source is applied to said X-coordinate deflection circuit and to a terminal which is adapted to receive the base electrode of a transistor under test; and said means including the differentiator circuit applies to said Y-coordinate deflection circuit a voltage related to the current that flows in a circuit which is adapted to receive the collector electrode of a transistor under test.

3. A circuit as in claim 2 wherein:

said display tube includes a beam intensity control electrode; and means are provided for applying a signal to said control electrode during the interval that signal from said source is increasing with time, whereby the cathode-ray display tube displays signals applied to the deflection circuits thereof only during said interval.

References Cited

UNITED STATES PATENTS

| | | | |
|---|---|---|---|
| 2,653,374 | 9/1953 | Matthews | 324—158 XR |
| 2,900,582 | 8/1959 | Moll | 324—158 |

OTHER REFERENCES

Proceedings of the IRE, November 1956, pages 1554–58.

ARCHIE R. BORCHET, *Primary Examiner.*

E. L. STOLARUN, *Assistant Examiner.*